(12) United States Patent
Kang et al.

(10) Patent No.: US 12,197,393 B2
(45) Date of Patent: Jan. 14, 2025

(54) METHOD OF DATA STRUCTURING FOR DIFFERENCE BETWEEN OLD AND NEW DATA AND DEVICE THEREOF

(71) Applicant: LUNA Co., Ltd., Daegu (KR)

(72) Inventors: Dong Soo Kang, Daegu (KR); Dong Hwan Lee, Daegu (KR); Tae Ho Lee, Daegu (KR); Seung Wook Baek, Daegu (KR)

(73) Assignee: KONAMOBILITY COMPANY LIMITED (KR)

( * ) Notice: Subject to any disclaimer, the term of this patent is extended or adjusted under 35 U.S.C. 154(b) by 508 days.

(21) Appl. No.: 17/051,435

(22) PCT Filed: Mar. 13, 2020

(86) PCT No.: PCT/KR2020/003495
§ 371 (c)(1),
(2) Date: Oct. 28, 2020

(87) PCT Pub. No.: WO2021/040168
PCT Pub. Date: Mar. 4, 2021

(65) Prior Publication Data
US 2021/0349855 A1  Nov. 11, 2021

(30) Foreign Application Priority Data
Aug. 27, 2019  (KR) .................. 10-2019-0105338

(51) Int. Cl.
*G06F 16/178* (2019.01)
*G06F 8/71* (2018.01)
(Continued)

(52) U.S. Cl.
CPC .............. *G06F 16/178* (2019.01); *G06F 8/71* (2013.01); *G06F 16/122* (2019.01); *G06F 16/1744* (2019.01); *G06F 16/1873* (2019.01)

(58) Field of Classification Search
CPC .. G06F 16/178; G06F 16/1873; G06F 16/122; G06F 16/1744; G06F 8/71
See application file for complete search history.

(56) References Cited

U.S. PATENT DOCUMENTS 6,681,382 B1 * 1/2004 Kakumani ................ G06F 8/71
717/121
2002/0099726 A1 * 7/2002 Crudele .................. G06F 8/658
(Continued)

FOREIGN PATENT DOCUMENTS

JP      2012190075 A   10/2012
KR      100390867 B1    7/2003
(Continued)

OTHER PUBLICATIONS

International Search Report for PCT/KR2020/003495 mailed Jun. 18, 2020.
(Continued)

*Primary Examiner* — Jensen Hu
(74) *Attorney, Agent, or Firm* — Renaissance IP Law Group LLP

(57) ABSTRACT

The present invention relates to a method of data structuring for difference between old and new versions of data and a device thereof, when generating and transmitting the difference to update software data comprising programs, kernels and filesystems installed on client devices such as autonomous vehicles and smartphones, provided are a data structuring method and a device necessary for generating and transmitting the difference data representing differential parts between old and new versions of software data.

2 Claims, 7 Drawing Sheets

(51) Int. Cl.
*G06F 16/11* (2019.01)
*G06F 16/174* (2019.01)
*G06F 16/18* (2019.01)

(56) References Cited

U.S. PATENT DOCUMENTS

| | | | | |
|---|---|---|---|---|
| 2004/0168165 | A1* | 8/2004 | Kokkinen | G06F 8/658 |
| | | | | 717/169 |
| 2005/0021572 | A1* | 1/2005 | Ren | G06F 8/658 |
| | | | | 707/999.203 |
| 2005/0091291 | A1* | 4/2005 | Kaler | G06F 8/71 |
| | | | | 707/999.203 |
| 2006/0123032 | A1* | 6/2006 | Manapetty | G06F 16/51 |
| | | | | 707/E17.031 |
| 2006/0242208 | A1* | 10/2006 | Goldick | G06F 16/10 |
| | | | | 707/999.203 |
| 2017/0122747 | A1* | 5/2017 | Park | G01C 21/26 |
| 2018/0173723 | A1* | 6/2018 | Pfeifle | G06F 16/29 |
| 2018/0307479 | A1 | 10/2018 | Subramanian et al. | |
| 2021/0287404 | A1* | 9/2021 | Chang | H04N 19/12 |

FOREIGN PATENT DOCUMENTS

| | | |
|---|---|---|
| KR | 20080037450 A | 4/2008 |
| KR | 20150005164 A | 1/2015 |
| KR | 101542323 B1 | 8/2015 |
| KR | 20150089591 A | 8/2015 |
| KR | 101822485 B1 | 1/2018 |

OTHER PUBLICATIONS

Written Opinion for PCT/KR2020/003495 mailed Jun. 18, 2020.
European Extended Search Report for Application No. 20788975.9, mailed Aug. 24, 2023.

* cited by examiner

METHOD OF DATA STRUCTURING FOR DIFFERENCE BETWEEN OLD AND NEW DATA AND DEVICE THEREOF

TECHNICAL FIELD

The present disclosure relates to a method of data structuring for difference between old and new data and a device thereof, and in more detail, when generating and transmitting a differential data to update a software data including programs, kernels and filesystems installed on client devices such as autonomous vehicles and smartphones, provided are a data structuring method and a device for generating and transmitting the differential data representing a difference between old and new versions of software data.

BACKGROUND ART

The Information Technology (IT) industry is focused on creating indirect values that encompasses the tangible and intangible technologies necessary for information means such as computers, software, Internet, multimedia, management innovation, and administrative reform. It includes business data, voice conversations, photos, video and multimedia, as well as all forms of technologies needed to develop, store and exchange information.

The IT industry is moving away from indirect value creation, and in recent years has been leading to the automotive industry, a traditional manufacturing industry focused on creating direct tangible values. In particular, as autonomous vehicles that autonomously drive while deciding their location and surrounding conditions are being developed, interest is increasing.

The autonomous vehicle is very important not only for a hardware device for processing a large amount of data, but also for continuous software management. In other words, in order to continually fix bugs and defects in hardware devices and respond quickly to changing laws and regulations, continuous software updates are essential.

On the other hand, as the functions of a wireless communication terminals such as smartphones become complicated, and the software installed in the wireless communication terminal also has many bugs, and the user's demands for adding functions are ever increasing. Therefore, there are needs to frequently perform software patching and function updating in a wireless communication terminal.

However, in case of the conventional autonomous vehicle as described above, in order to update the software, it is necessary to visit a service center or a dealer shop, and thus there is a problem in time and economic inefficiencies.

In addition, in case of a wireless communication terminal, it is necessary to download software through a network in order to perform software patch or functional update. However, because of the large amount of data, it takes a lot of time to download, a large amount of traffic is generated, and the cost of using the data is also increased. And there is a problem in that the wireless communication terminal cannot efficiently use radio resources like the situation that other tasks cannot be performed while downloading and patching the software.

That is, in order to efficiently update the software used in the autonomous vehicle or wireless communication terminal, it is necessary to use an update file of a small size as much as possible.

To this end, the need for a data structure to generate update files more efficiently is increasing.

Therefore, the present invention provides a method and device for data structuring for a differential data representing a difference between old and new versions of software data used in client devices, when updating software data including programs, kernels and filesystems installed on client devices including autonomous vehicles or smartphones.

In particular, in the present invention, a delta data structure that is a differential data stream including a delta header and a delta body is generated. The delta header includes version information of the differential data, number of partitions, delta size for each partition, and patch information for normal or resume. The delta body includes data for a partitions and at least one or more sub delta included in each of the partitions. Also, delta data structures can be generated differently for each of a program, a kernel, and a filesystem.

Next, the prior art existing in the technical field of the present invention will be briefly described, and then the technical matters to be differentiated from the prior arts will be described.

First, Korean Patent Registration No. 1552323 (2015.08.05.) relates to an update data processing method and a computing device for efficiently tracking update data in a computing device. A configuration for an update data management table including at least one or more of a valid flag area, a virtual address base area, a physical address base area, and a next update address information area is presented.

That is, the prior art describes a method and apparatus for efficiently tracking update data through an update data management table including a valid flag area, a virtual address base area, a physical address base area, and a next update address information area.

In addition, Korean Patent Publication No. 2008-0037450 (2008.04.30.) relates to an update system and method of a software execution module, including header information and update information for at least one or more partition. The header information presents a configuration for an update package including terminal and software identification information, distinction information indicating whether the update package was generated through file-to-file comparison, whether the update package was generated by comparing the terminal software program image and the new version software, or checksum information.

That is, the prior art describes a system and method for improving update efficiency by dramatically reducing the amount of data transmitted between the mobile terminal and the update server.

As a result of reviewing the prior arts above, the above prior arts propose a configuration that efficiently tracks update data through an update data management table, and a configuration that dramatically reduces the amount of data transmitted between a mobile terminal and an update server through an update package.

On the other hand, the present invention relates to generate a delta data structure that is a difference data stream including a delta header and a delta body, in order to generate a differential data for old and new version of software data used in a client device, when updating software data including programs, kernels and filesystems in a client device. The delta header includes version information of the differential data, number of partitions, delta size for each of the partitions, and patch information for normal or resume, and the delta body includes data for a partition and at least one or more sub delta included in each of the partitions. In particular, delta data structures can be generated for different programs, kernels, and filesystems. The prior arts do not describe or suggest these technical features of the present invention.

DISCLOSURE

Technical Problem

The present invention was created to solve the above problems. An object of the present invention is to provide a data structuring method and a device for a differential data used on updating software data installed in a client device such as an autonomous vehicle or a smartphone.

Another object of the present invention is to provide a data structuring method and a device for generating a delta data structure (i.e., a differential data stream) for a differential data representing a difference between old and new versions of software data, including a delta header and a delta body. Wherein, the delta header includes version information of the difference, number of partitions, delta size for each of the partitions and patch information for normal or resume. The delta body includes data for partitions and at least one or more sub delta included in each of the partitions. The delta body includes a sub delta header and at least one or more sub delta body including block information included in each partition.

Another object of the present invention is to provide a data structuring method and a device for a difference between old and new data that can differently generate a delta data structure for each program, kernel, and filesystem.

Technical Solution

A method of data structuring for a difference between old and new data, comprises: generating a delta header including version information of the difference, a number of partitions, delta size for each of the partitions, and patch information for normal or resume to generate the difference between old and new version of software data in a difference generation processor; and generating a delta body including data for the partitions and at least one or more sub delta included in the partition in the difference generation processor. The generated delta body comprises a sub delta header and at least one or more sub delta body including block information included in each of the partitions. The sub delta body comprises a block header and a block body for a specific block.

Wherein, the sub delta header is differently generated for each of a program, a kernel, and a filesystem.

Wherein, the sub delta header, in case of the program, is generated by including type information of the sub delta, compression information of whether the sub delta body is compressed or not, size information of the sub delta body, number information of the number of the sub delta body, checksum of old version of the program, and checksum of new version of the program.

Wherein, the sub delta header, in case of the kernel, is generated by including type information of the sub delta, compression information of whether the sub delta body is compressed or not, size information of the sub delta body, number information of the number of the sub delta body, checksum of old version of the kernel, and checksum of new version of the kernel.

Wherein, the filesystem header comprises type information of the sub delta, number information of the number of the file, the filesystem sub header comprises file path information, status information for adding, modifying and deleting files, attribute information for general, symbolic, and links of files, compression information of whether the file is compressed or not, size information of the sub delta body, checksum of old version of the file, checksum of new version of the file, and number information of the number of the sub delta body.

Wherein, the block header comprises Equal and Mod length data size information of the block body, Mod data size information of the block body, Insert data size information of the block body, Insert length data size information of the block body, data type information of the block body, block size information, checksum of old version of the block, and checksum of new version of the block. And the block body comprises Mod actual data, Insert actual data, Equal and Mod length data, and Insert length data, Wherein, the Mod actual data is the modified binary data, and is sequentially stored as long as the Mod length specified by the Mod length data in the Equal and Mod length data. The Insert actual data is the inserted binary data, and is sequentially stored as long as the Insert length specified by the Insert length data in the Insert length data. The Equal and Mod length data comprise Equal length that is length information of the same binary data, Mod length that is length information of the modified binary data, and a delimiter indicating the existence of the inserted binary data. The Insert length data comprises Insert length that is length information of the inserted binary data, and identical offset that is location information of the next identical binary data.

Moreover, a device of data structuring for difference between old and new data, comprises: a difference generation processor configured to generate a delta header comprising version information of the difference, the number of partitions, delta size for each of the partitions, and patch information for normal or resume to generate the difference between old and new version of software data; and generate a delta body comprising data for the partitions and at least one or more sub delta comprised in the partition. The generated delta body comprises a sub delta header and at least one or more sub delta body including block information included in each of the partitions. The sub delta body comprises a block header and a block body for a specific block.

Wherein, the difference generation processor differently generates the sub delta header for each of a program, a kernel, and a filesystem.

Wherein, the difference generation processor, in case of the program, generates type information of the sub delta, compression information of whether the sub delta body is compressed or not, size information of the sub delta body, number information of the number of the sub delta body, checksum of old version of the program, and checksum of new version of the program.

Wherein, the difference generation processor, in case of the kernel, generates type information of the sub delta, compression information of whether the sub delta body is compressed or not, size information of the sub delta body, number information of the number of the sub delta body, checksum of old version of the kernel, and checksum of new version of the kernel.

Wherein, the difference generation processor, in case of the filesystem, generates a sub delta header comprising a filesystem header and a filesystem sub header. the filesystem header comprises type information of the sub delta, number information of the number of the file, the filesystem sub header comprises file path information, status information for adding, modifying and deleting files, attribute information for general, symbolic, and links of files, compression information of whether the file is compressed or not, size information of the sub delta body, checksum of old version of the file, checksum of new version of the file, and number information of the number of the sub delta body.

Wherein, the difference generation processor generates the block header, which comprises Equal and Mod length data size information of the block body, Mod data size information of the block body, Insert data size information of the block body, Insert length data size information of the block body, data type information of the block body, block size information, checksum of old version of the block, and checksum of new version of the block. And the difference generation processor comprises the block body, which comprises Mod actual data, Insert actual data, Equal and Mod length data, and Insert length data.

Wherein, the Mod actual data is the modified binary data, and is sequentially stored as long as the Mod length specified by the Mod length data in the Equal and Mod length data. The Insert actual data is the inserted binary data, and is sequentially stored as long as the Insert length specified by the Insert length data in the Insert length data. The Equal and Mod length data comprise Equal length that is length information of the same binary data, Mod length that is length information of the modified binary data, and a delimiter indicating the existence of the inserted binary data. The Insert length data comprises Insert length that is length information of the inserted binary data, and identical offset that is location information of the next identical binary data.

Advantageous Effects

As described above, a method and a device of data structuring for a difference between old and new data according to the present invention generates a difference into a delta data structure (i.e., a differential data stream) comprising a delta header and a delta body, wherein the difference is used on updating software data including programs, kernels and filesystems installed on client devices such as autonomous vehicles or smart phones. Therefore, it is possible to accurately and quickly generate the difference representing different parts between old and new versions of software data. And software data of a client device can be easily updated by using the difference.

In addition, the present invention can increase temporal and economic efficiencies and convenience because a user of a client device does not have to directly visit a service center or a designated place for software update. And the present invention can improve system stability of the client device by enabling the user to actively manage the software data for changes in laws or systems, and bugs and defects in the software data.

DETAILED DESCRIPTION

Figure 1:
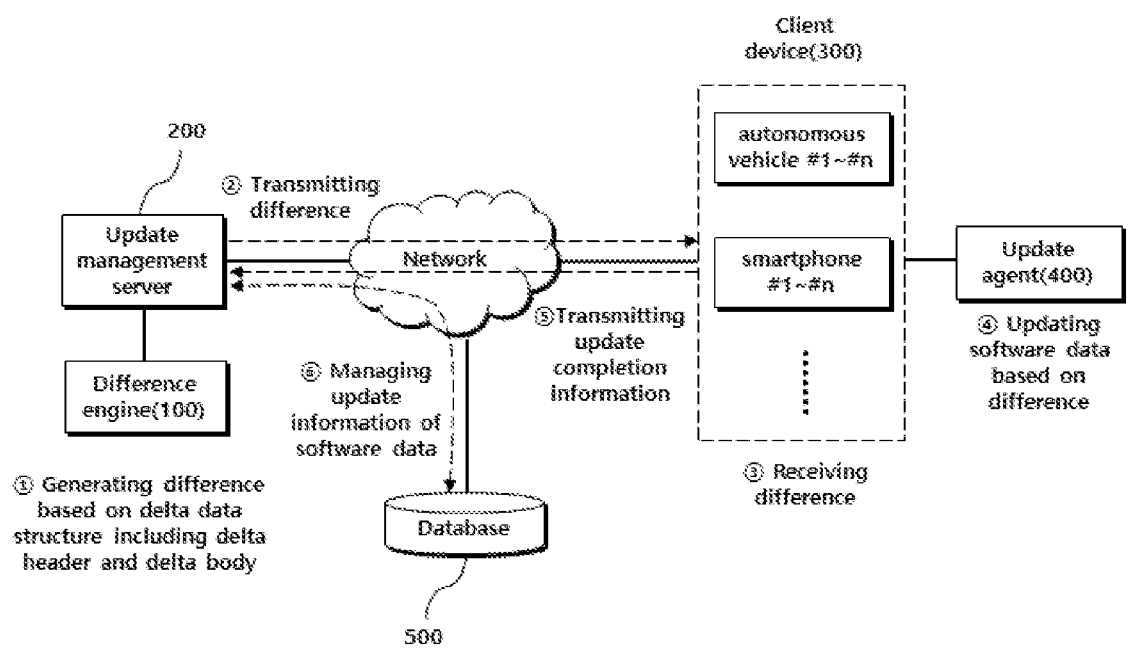
FIG. 1 is a drawing for explaining the configuration of the entire system in which the data structuring is applied to the difference between old and new data according to one embodiment of the present invention.

Hereinafter, a preferred embodiment of a method and device of data structuring for difference between old and new data of the present invention are described in detail with reference to the accompanying drawings. The same reference numerals denoted in each drawing indicate the same members. In addition, specific structural or functional descriptions for the embodiments of the present invention are exemplified for the purpose of describing the embodiments according to the present invention, and unless defined otherwise, all terms used herein, including technical or scientific terms have the same meaning as generally understood by an ordinary skilled person in the field of the art to which the present invention belongs. Terms as those defined in a commonly used dictionary should be interpreted as having meanings consistent with meanings in the context of related technologies, and it is preferable for the terms not to be interpreted as ideal or excessively formal meanings unless explicitly defined herein the present specification.

First, a target updated by using difference generated in the present invention is a software data including a program, a kernel, and a file system. The software data is binary data in principle, but it is a matter of course to support any data format including ASCII. That is, each of program, kernel and file system is preferably composed of binary data.

Meanwhile, in the present invention, it is possible to update binary data of each file in each folder while maintaining a structure of a folder in a specific file system, and update binary data of the entire specific file system.

However, in the present invention, it is a principle to update binary data of individual files while maintaining a structure of a folder in a specific file system. In this case, difference does not occur for a file unchanged in a new version of file system, and difference is generated only for a file changed in the new version of file system. Therefore, it is possible to reduce cost due to data generation, improve update speed of the file system, and moreover increase system stability related to the update.

On the other hand, when binary data is updated for a specific entire file system, if there exists information added to new version of a file system, it is inefficient because it creates a difference even for files that have not been changed after the point that the added information exists. Therefore, in this case, it is preferable to process the binary data separately with the changed part and the unchanged part.

The program refers to as an application program, a system program and the like, and indicates data deciding operations of the program or recorded according to a certain format.

The kernel is the most important core of a computer operating system. The kernel comprises an interrupt handler that processes all requests competitively requesting the service of the kernel, like terminating input/output operations, a scheduler determining which programs and what order share kernel processing time, and a supervisor that actually gives each process an approval to use the computer at the end of a schedule. The kernel has a memory manager that manages address space of operating system in a memory or a storage and evenly distributes the memory or storage to other users using all peripherals and kernel's services.

The file system keeps a set of preparing rules organized for reading, writing, and finding data from/on a hard disk drive in advance in order to record data on a computer, and refers to as a system indicating how to name computer files and where to place computer files logically for storage or retrieval of the computer files. All operating systems such as DOS, Windows, OS/2, Macintosh, Unix and so on comprise their own file systems, for example, FAT16, FAT32, NTFS are prepared for Windows, and ext2, reiserFS, ext3 are prepared for Linux. Files are also saved in a directory and newly generated files are named, the length of a file name is limited, which characters can be used are indicated, and the length of file name extension is limited. A file system can comprise a format for setting a path to a file through a directory structure. Sometimes a file system refers to as a part of OS or additional programs that support to organize files. NFS (Network File System) or AFS (Andrew File System) are representative.

FIG. 1 is a drawing for explaining the configuration of the entire system in which the data structuring is applied to the difference between old and new data according to one embodiment of the present invention.

As shown in FIG. 1, the present invention relates to data structuring for the difference indicating different parts between old and new versions of software data. The present invention updates software data installed in various electronic devices possessed by a user by using the difference generated through a specific data structure.

For the achievement of the above, a device according to the present invention comprises a difference engine 100, an update management server 200, a client device 300, an update agent 400, a database 500, and the like.

The difference engine 100 is a difference generation device, and when a software data comprised at least one of a program, a kernel, and a filesystem is changed through operations such as modification, insertion, and deletion, generates a difference in which only different parts (that is, parts that have been modified, inserted, deleted, etc.) between old and new data are selected at the request of the update management server 200. And the difference engine 100 provides the generated difference to the client device 300 through the update management server 200. Accordingly, the update agent 400, which is provided on the client device 300 or provided on an independent device, performs software update simply and quickly.

That is, the difference engine 100 generates different parts between the old and new versions of the software data, not all of the new version of the software data, provides the different parts to the client device 300 so that the update is made, and thereby not only reducing the cost incurred due to transmitting the new version of the software data, but speeding up the update of the software data and improving the reliability of the systems related to updating the software data.

Wherein, the difference engine 100 generates the difference between old and new data based on a delta data structure (i.e., the differential data stream) comprising a delta header and a delta body. The data structure for the difference is described in more detail with reference to FIG. 3 to FIG. 9.

Meanwhile, the difference engine 100 is implemented as an independent device as shown in FIG. 1, and can be applied in communication with the update management server 200. In addition, the difference engine 100 can be integrally constructed and used in the update management server 200.

The update management server 200 is a computer operated by a business operator performing update and management of software data used in the client device 300. When new software data is generated, the update management server 200 requests the difference engine 100 to generate a difference between old and new versions of software data.

In addition, when the difference generated by comparing old and new versions of software data is inputted from the difference engine 100, the update management server 200 transmits the difference to the corresponding client device 300 through the network so as to update old version of software data through the update agent 400. And when the update completion information is received from the client device 300, the update management server 200 stores and manages update information of the software data in the database 500.

The client device 300 is an electronic device driven based on a software data, like a wireless communication terminal or an autonomous vehicle. An autonomous vehicle is a device that grasps the surroundings and visits by itself to a destination by using a map, a satellite navigation system (GPS), and various sensors.

In addition, when the differential data between the old and new versions of the software data is generated in the difference engine 100 and received from the update management server 200 through the network, the client device 300 provides the differential data between old and new versions of the software data to the update agent 400 so as to update the old version of the software data with the new version of the software data based on the differential data. And when the update of the software data is completed, the client device 300 generates update completion information, and the generated update completion information is transmitted to the update management server 200 through the network.

The update agent 400 is embedded in the client device 300 or implemented in an independent device. And the update agent 400 patches (or corrects) the old version of the software data installed in the client device 300 to the new version of the software data by referring to the differential data provided from the update management server 200.

In addition, in the process of patching with the new version of the software data based on the differential data, when the patching is forcibly terminated (for example, in the case of happening an event that a user stops to process a program for the patching or a battery is exhausted or runs out), the update agent 400 additionally provides a resume function that resumes the patching again from the point (i.e., position or corresponding step of the patching) where the patching was previously completed, not restarts the patching from the beginning point.

That is, if the patching is forcibly stopped while the patching is in progress, the update agent 400 identifies (or checks) the previously normally completed position by referring to block checksum information when the next patching is executed again, and restarts the patching from the position where the patching is previously completed. Accordingly, a fast and stable patch operation can be performed.

The database 500 stores and manages device types, software data versions, update history, etc. of the client device 300 as well as the difference comparing old and new versions of software data generated by the difference engine 100.

Hereinafter, a process of generating a difference between old and new versions of software data by using the data structure proposed in the present invention and updating the software data installed in the client device 300 based on the difference are described in detail as follows.

The difference engine 100 generates a difference between the old and new versions of software data at the request of the update management server 200 (①), and outputs the generated difference to the update management server 200. Wherein, the difference engine 100 generates a difference based on a delta data structure comprising a delta header and a delta body. The delta header comprises version information of the difference, number of partitions, delta size for each of the partitions, and patch information for normal or resume. The delta body comprises data for a partition and at least one or more sub delta comprised in the partition.

Then, the update management server 200 transmits the difference provided from the difference engine 100 to the client device 300 to be updated through the network (②). The client device 300 receives the difference, and outputs it to the update agent 400 (③).

Accordingly, the update agent 400 updates old version of software data with new version of software data based on the difference received from the update management server 200 (④).

When the update of software data is completed based on the difference, the client device 300 generates update completion information of the software data, and transmits the generated update completion information to the update management server 200 through a network (⑤).

Also, the update management server 200 stores update information of software data for each client device 300 in the database 500 based on update completion information of software data provided from the client device 300, and then finishes the update operation (⑥).

Figure 2:
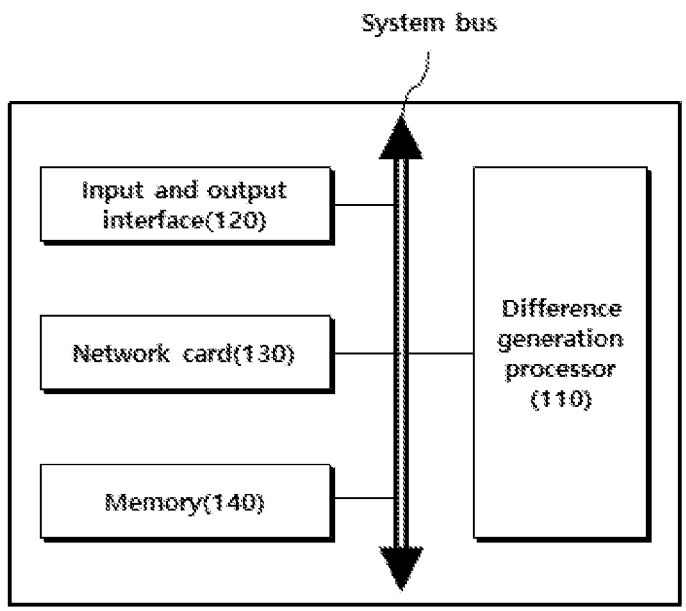
FIG. 2 is a drawing showing the hardware structure of the difference engine for data structuring for the difference between old and new data according to one embodiment of the present invention.

FIG. 2 is a drawing showing the hardware structure of the difference engine for data structuring for the difference between old and new data according to one embodiment of the present invention.

As shown in FIG. 2, the hardware structure of the difference engine 100 according to an embodiment of the present invention comprises a difference generation processor 110, input and output interface 120, a network card 130, memory 140, and the like.

Also, although not shown in the drawing, the difference engine 100 can further comprise a power supply for supplying operating power to each component, an input processor for data input for various functions, and the like. Also, the difference engine 100 programs a data structure for recording a difference between old and new data or an information for generating a difference based on the data structure through various programming languages as an example of a Java, and stores the programs in the memory 140. And functions for each component are performed by responding to calls from the difference generation processor 110.

The difference generation processor 110 processes the generation of a difference as a result of comparing old and new versions of software data based on a data structure comprising a delta header and a delta body. As needed, it is possible to generate a difference based on the data structure by calling the program stored in the memory 140.

The input and output interface 120 performs a function of exchanging data with an administrator terminal who manages the difference engine 100, as well as performs a function of inputting information on the operation of the difference engine 100.

The network card 130 is a part providing an interface for communication between the difference engine 100 and the update management server 200, and thus it can be configured to simultaneously support wired communication and wireless communication.

The memory 140 stores various operational programs used in the difference engine 100. For example, it stores information on a specific data structure for recording the difference or a program for generating the difference.

Also, the memory 140 temporarily stores the difference which is a result of comparing old and new data generated through the data structure in the difference generation processor 110.

Meanwhile, the system bus connects each component constituting the hardware of the difference engine 100 comprising the difference generation processor 110, the input and output interface 120, the network card 130, and the memory 140, so that data can be transferred among the components via the system bus.

Next, the data structure for the difference is described in more detail with reference to FIG. 3 to FIG. 9. Wherein, the bolded portions of each item of the data structure illustrated in FIG. 4 to FIG. 9 are essential items.

Figure 3:
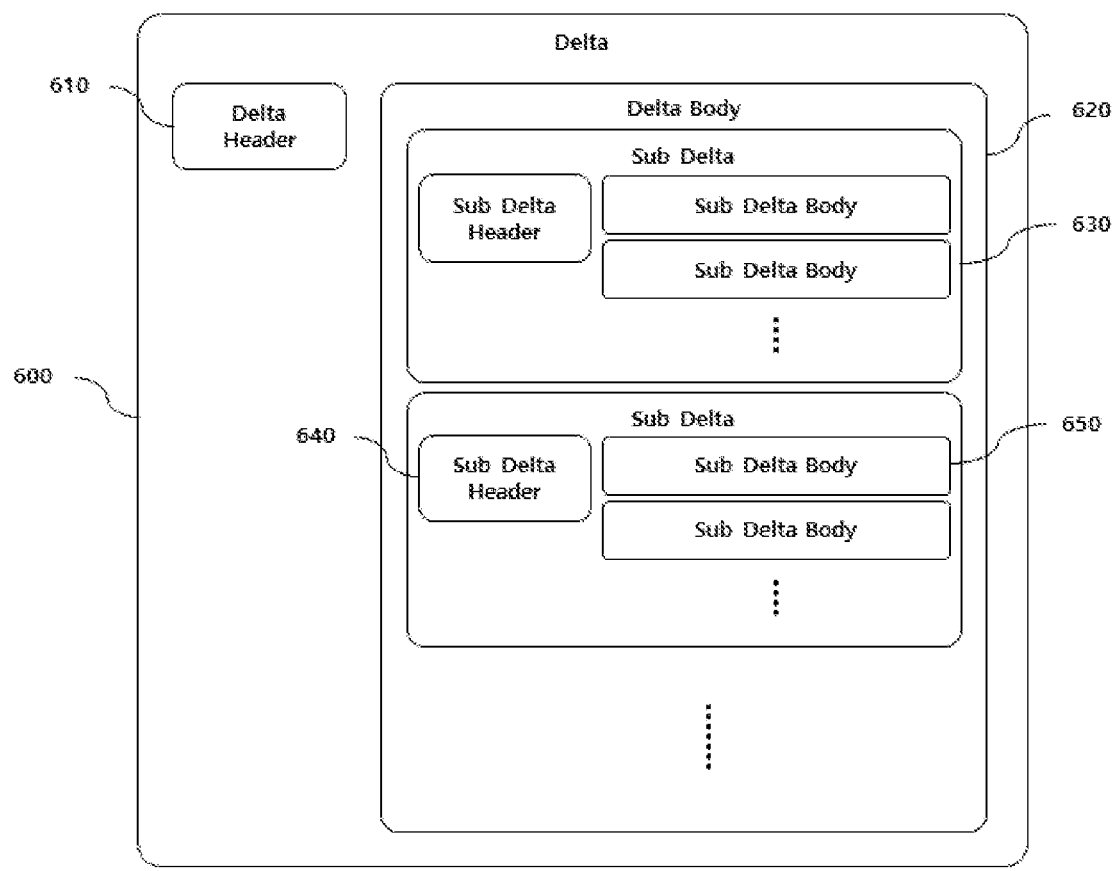
FIG. 3 is a drawing illustrating in detail a delta data structure (differential data stream) according to an embodiment of the present invention.

FIG. 3 is a drawing illustrating in detail a delta data structure (differential data stream) according to an embodiment of the present invention.

As shown in FIG. 3, the delta data structure 600, which is a data structure for a difference applied to the present invention, comprises a delta header 610 and a delta body 620.

The delta body 620 comprises at least one or more sub delta 630 comprising partitions and information included in each of the partitions. That is, the sub delta 630 is generated as many as the number of partitions.

Figure 5:
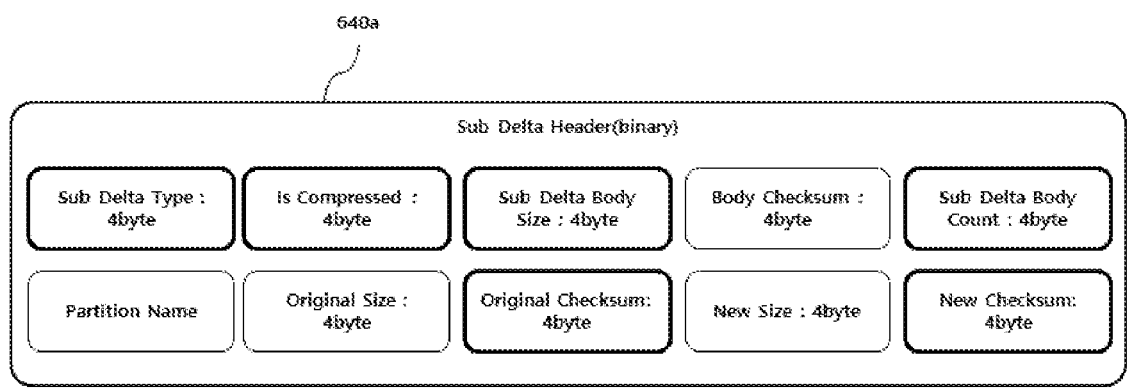
FIG. 5 is a drawing showing in detail a data structure of a sub delta header (in case of a binary) according to an embodiment of the present invention.
Figure 6:
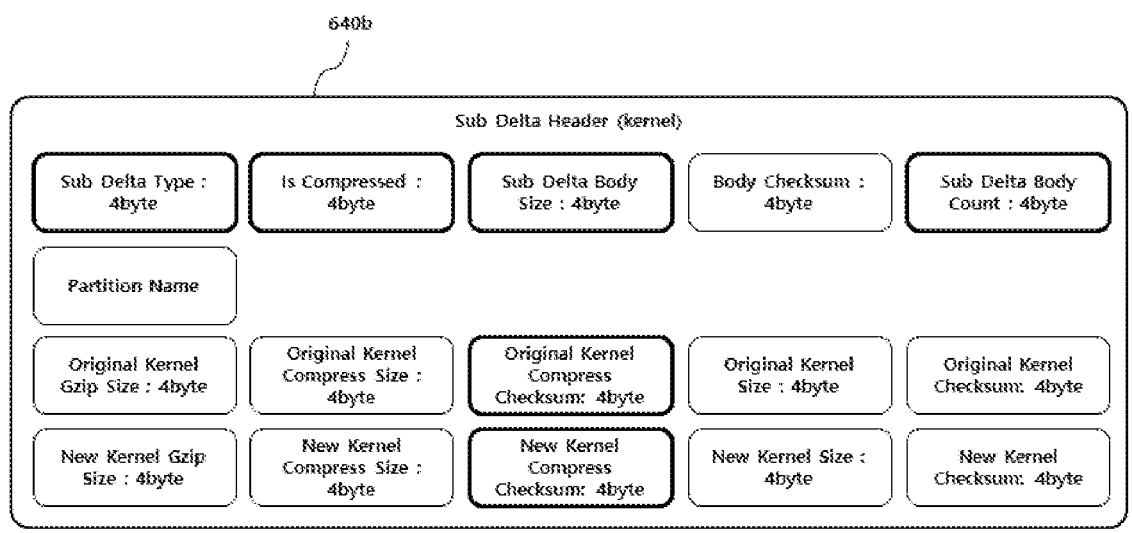
FIG. 6 is a drawing showing in detail a data structure of a sub delta header (in case of a kernel) according to an embodiment of the present invention.
Figure 7:
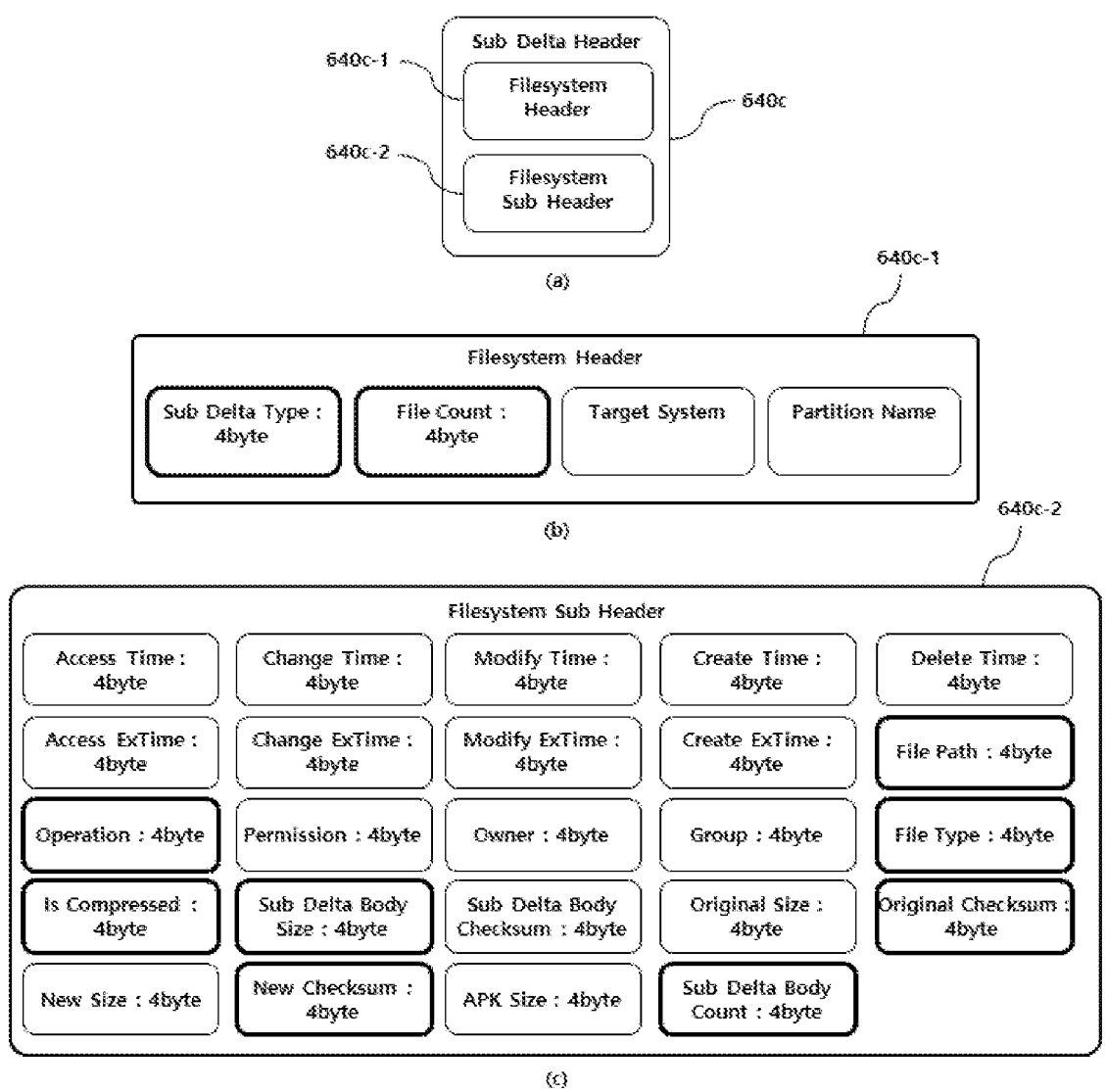
FIG. 7 is a drawing illustrating in detail a data structure of a sub delta header (in case of a filesystem) according to an embodiment of the present invention.
Figure 8:
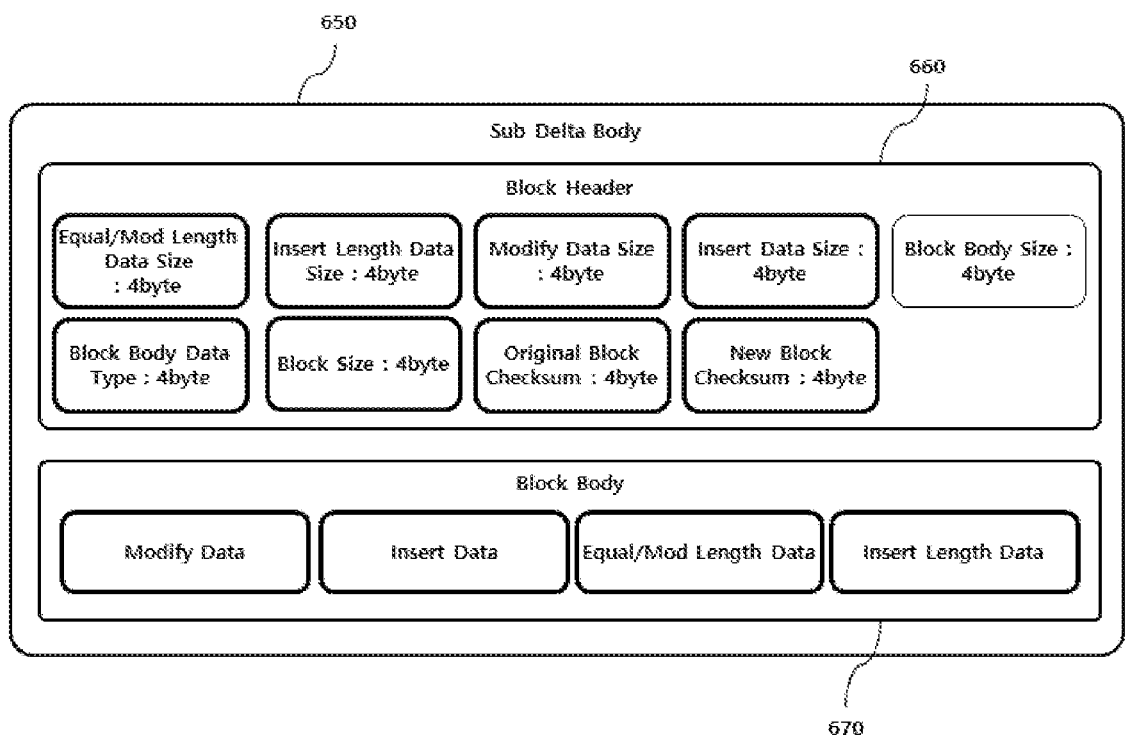
FIG. 8 is a drawing illustrating in detail a data structure of a sub delta body according to an embodiment of the present invention.

The sub delta 630 comprises the sub delta header 640 and at least one or more sub delta body 650 comprising block information included in each of the partitions. The sub delta body 650 comprises a block header 660 and a block body 670 for specific block information as shown in FIG. 8. Wherein, the sub delta header 640 can be differently generated for each of a program, a kernel, and a filesystem as shown in FIG. 5 to FIG. 7.

The partition is data that is separated by different partitions depending on a program, a kernel, or a filesystem, and the partition comprises at least one or more block.

In case of the program (binary) and the kernel, the block is data obtained by dividing the entire data into a predetermined block size. And in case of the filesystem, the block is data obtained by dividing each file data constituting the filesystem by the block size.

Figure 4:
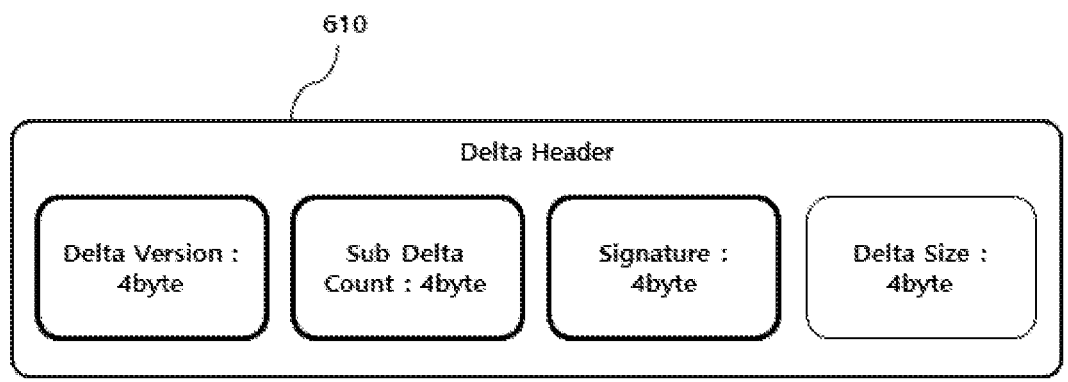
FIG. 4 is a drawing showing in detail a data structure of a delta header according to an embodiment of the present invention.

FIG. 4 is a drawing showing in detail a data structure of a delta header according to an embodiment of the present invention.

As shown in FIG. 4, the delta header 610 has Delta Version, Sub Delta Count and Signature as essential items. And the delta header 610 can be generated by adding an item of Delta Size. Wherein, each item has a size of 4 bytes.

The Delta Version item is a portion in which the version of the delta data structure 600 is recorded and version information of a difference for checking validity when the patch is performed. The Sub Delta Count item is a portion in which information on the number of partitions is recorded. The Signature item is a portion in which patch information for normal or resume is recorded. The Delta Size item is a portion in which size information of the delta body 620 is recorded.

Wherein, the Signature item is composed of a checksum (CRC 32) value (A) and a signature value (B) of the delta header. Signature value (B) is recorded with a specific value when the patch is stopped in the process of patching based on the difference in the update agent 400. Accordingly, when the patch is processed based on the difference in the update agent 400, if the A value and the B value are the same, it is checked as a normal patch, and if the A value and the B value are not the same, it is checked as a restart patch.

FIG. 5 is a drawing showing in detail a data structure of a sub delta header (in case of a binary) according to an embodiment of the present invention.

As shown in FIG. 5, a program (as a binary) sub delta header 640a is composed of Sub Delta Type, Is Compressed, Sub Delta Body Size, Sub Delta Body Count, Original Checksum and New Checksum as essential items. And it can be generated by adding the items of Body Checksum, Partition Name, Original Size and New Size. Wherein, each item has a size of 4 bytes.

The Sub Delta Type item is a portion in which type information of the sub delta header 640 (here, as a program, the program is a type to perform a normal patch) is recorded. The 'Is Compressed' item is a portion in which whether the sub delta body 650 is compressed or not is recorded. The Sub Delta Body Size item is a portion in which the entire size information of the sub delta body 650 is recorded (if compressed, the compressed size is recorded). The Sub Delta Body Count item is a portion in which number information of the sub delta body 650 (that is, number of blocks in a partition) is recorded. The Original Checksum item is a portion in which a checksum (CRC 32) of an old version of a program for checking validity of target data is recorded before a patch is processed. The New Checksum item is a portion in which the checksum (CRC 32) of a new version of a program is recorded for checking validity of whether old version of a data is normally patched after the patch is processed.

In addition, the Body Checksum item is a portion in which the entire checksum (CRC 32) of the sub delta body 650 is recorded, The Partition Name item is the portion in which the partition name is recorded. The Original Size item is a portion in which the size of an old version of a data is recorded. The New Size item is a portion in which the size of a new version of a data is recorded.

FIG. 6 is a drawing showing in detail a data structure of a sub delta header (in case of a kernel) according to an embodiment of the present invention.

As shown in FIG. 6, a kernel sub delta header 640b is composed of Sub Delta Type, Is Compressed, Sub Delta Body Size, Sub Delta Body Count, Original Kernel Compress Checksum, and New Kernel Compress Checksum as essential items. And it can be generated by adding the items of Body Checksum, Partition Name, Original Kernel Gzip Size, Original Kernel Compress Size, Original Kernel Size, Original Kernel Checksum, New Kernel Gzip Size, New Kernel Compress Size, New Kernel Size and New Kernel Checksum. Wherein, each item has a size of 4 bytes.

The Sub Delta Type item is a portion in which the type information of the sub delta header 640 (here, as a kernel, kernel is a type to be compressed, and thus, normal patch is performed after decompression, and the patched kernel is compressed again) is recorded. The 'Is Compressed' item is a portion in which whether the sub delta body 650 is compressed or not is recorded. The Sub Delta Body Size item is a portion in which the entire size information of the sub delta body 650 is recorded (if compressed, the compressed size is recorded). The Sub Delta Body Count item is a portion in which number information of the sub delta body 650 (that is, number of blocks in a partition) is recorded. The Original Kernel Compress Checksum item is a portion in which a checksum (CRC 32) of an old version of a kernel is recorded for checking validity of target data before a patch is processed. The New Checksum item is a portion in which the compressed checksum (CRC 32) of a new version of a kernel is recorded for checking validity of whether old version of a data is normally patched or not after the patch is processed. 1041 In addition, the Body Checksum item is a portion in which the entire checksum (CRC 32) of the sub delta body 650 is recorded, The Partition Name item is a portion in which the partition name is recorded. The Original Kernel Gzip Size item is a portion in which a Gzip size of an old version of a kernel is recorded. The Original Kernel Compress Size item is a portion in which a compression size of an old version of a kernel is recorded. The Original Kernel Size item is a portion in which a size of an old version of a kernel is recorded. The Original Kernel Checksum item is a portion in which a checksum (CRC 32) of an old version of a kernel is recorded, The New Kernel Gzip Size item is a portion in which a Gzip size of a new version of a kernel is recorded. The New Kernel Compress Size item is a portion in which a compressed size of a new version of a kernel is recorded. The New Kernel Size item is a portion in which a size of a new version of a kernel is recorded. The New Kernel Checksum item is a portion in which a checksum (CRC 32) of a new version of a kernel is recorded.

FIG. 7 is a drawing illustrating in detail a data structure of a sub delta header (in case of a filesystem) according to an embodiment of the present invention.

As shown in FIG. 7(a), a filesystem sub delta header 640c is generated composed of a filesystem header 640c-1 and a filesystem sub header 640c-2.

As shown in FIG. 7(b), the filesystem header 640c-1 is composed of Sub Delta Type and File Count as essential items. And the filesystem header 640c-1 can be generated by adding an item of Target System or Partition Name. Wherein, the essential items have a size of 4 bytes.

The Sub Delta Type item is a portion in which the type information of the sub delta header 640 (here, as a filesystem, the filesystem is a type to perform a normal patch in a unit of each file) is recorded. The File Count item is a portion in which information on number of files is recorded. 1091 In addition, the Target System item is a portion in which information related to a type of a system (for example, Linux, QNX, etc., mounting method varies depending on the type of system) is recorded. The Partition Name item is a portion in which the partition name is recorded.

As shown in FIG. 7(c), the filesystem sub-header 640c-2 is composed of File Path, Operation, File type, Is Compressed, Sub Delta Body Size, Original Checksum, New Checksum and Sub Delta Body Count as essential items. And the filesystem sub header 640c-2 can be generated by adding items of Access Time, Change Time, Modify Time, Create Time, Delete Time, Access ExTime, Change ExTime, Modify ExTime, Create ExTime, Permission, Owner, Group, Sub Delta Body Checksum, Original Size, New Size and APK Size. Wherein, each item has a size of 4 bytes.

The File Path item is a portion in which path information of a file is recorded. The Operation item is a portion in which a file status information of addition, modification, and deletion is recorded. The File type item is a portion in which the property information of a file is recorded as general, symbolic and link. The 'Is Compressed' item is a portion in which whether a file is compressed or not is recorded. The Sub Delta Body Size item is a portion in which full size information of the sub Delta body 650 is recorded. The Original Checksum item is a portion in which a checksum (CRC 32) of an old version of a file is recorded for checking validity of target data before a patch is processed. The New Checksum item is a portion in which the checksum (CRC 32) of a new version of a file is recorded for checking validity of whether old version of a data is normally patched after the patch is processed. The Sub Delta Body Count item is a portion in which number information of the sub delta body 650 (i.e., number of blocks in a file) is recorded.

In addition, the Access Time item is a portion in which the access time (in a second precision) of the file is recorded. The Change Time item is a portion in which the time (in a second precision) at which property of the file was modified is recorded. The Modify Time item is a portion in which the time (in a second precision) at which the file was modified is recorded. The Create Time item is a portion in which the time (in a second precision) at which the file was generated is recorded. The Delete Time item is a portion in which the time (in a second precision) at which the file was deleted is recorded. The Access ExTime item is a portion in which the access time (in a nanosecond precision) of a file is recorded. The Change ExTime item is a portion in which the time (in a nanosecond precision) at which property of the file was modified is recorded. The Modify ExTime item is a portion in which the time (in a nanosecond precision) at which the file was modified is recorded. The Create ExTime item is a portion in which the time (in a nanosecond precision) at which the file was generated is recorded. The Permission item is a portion in which the permission information of the file is recorded. The Owner item is a portion in which owner information of the file is recorded. The Group item is a portion in which group information of the file is recorded. The Sub Delta Body Checksum item is a portion in which the entire checksum (CRC 32) of the sub delta body 650 is recorded. The Original Size item is a portion in which size information of old version of a data is recorded. The New Size item is a portion in which size information of new version of a data is recorded. The APK Size item is a portion in which size information of APK decompressed data is recorded.

FIG. 8 is a drawing illustrating in detail a data structure of a sub delta body according to an embodiment of the present invention.

As shown in FIG. 8, the sub delta body 650 is generated by comprising a block header 660 and a block body 670 for specific block information.

The block header 660 is composed of Equal/Mod Length Data Size, Insert Length Data Size, Modify Data Size, Insert Data Size, Body Block Data Type, Block Size, Original Block Checksum and New Block Checksum as essential items. And the block header 660 can be generated by adding the item of Block Body Size. Wherein, each item has a size of 4 bytes.

The Equal/Mod Length Data Size item is a portion in which the Equal and Mod length data size information of the block body 670 is recorded. The Insert Length Data Size item is a portion in which Insert length data size information of the block body 670 is recorded. The Modify Data Size item is a portion in which Mod data size information of the block body 670 is recorded. The Insert Data Size item is a portion in which Insert length data size information of the block body 670 is recorded. The Body Block Data Type item is a portion in which data type information of the block body 670 is recorded. The Block Size item is a portion in which block size information is recorded as a basis for difference generation or a patch. The Original Block Checksum item is a portion in which a checksum (CRC 32) of an old version of a block is recorded for checking validity of target data before a patch is processed. The New Block Checksum item is a portion in which the checksum (CRC 32) of the new version of a block is recorded for checking validity of whether the old version of a data is normally patched after the patch is processed. The Block Body Size item is a portion in which size information of the block body 670 is recorded.

Wherein, the Body Block Data Type item is the length of the individual data of the block body 670, and the optimal data length according to the size of the individual data (for example, 2 bytes, 4 bytes, 8 bytes, etc.) is set when generating a difference. In addition, a separator of 0xFEFF (small type) for a data length of 2 bytes, 0xFCFDFEFF (normal type) for a data length of 4 bytes, and 0xF8F9FAFBFCFDFEFF (big type) for a data length of 8 bytes is used. For example, if the value of Equal Length is greater than 0xFFFFFF, the difference is obtained by setting the data size to 4 bytes. And if the value of Equal Length is greater than 0xFFFFFFFF, the difference is obtained by setting the data size to 8 bytes.

In addition, the block body 670 is generated with Modify Data, Insert Data, Equal/Mod Length Data, and Insert Length Data as essential items.

The Modify Data item is a portion in which Mod actual data is recorded. The Insert Data item is a portion in which Insert actual data is recorded. The Equal/Mod Length Data item is a portion in which Equal and Mod length data are recorded. The Insert Length Data item is a portion in which Insert length data is recorded.

Figure 9:
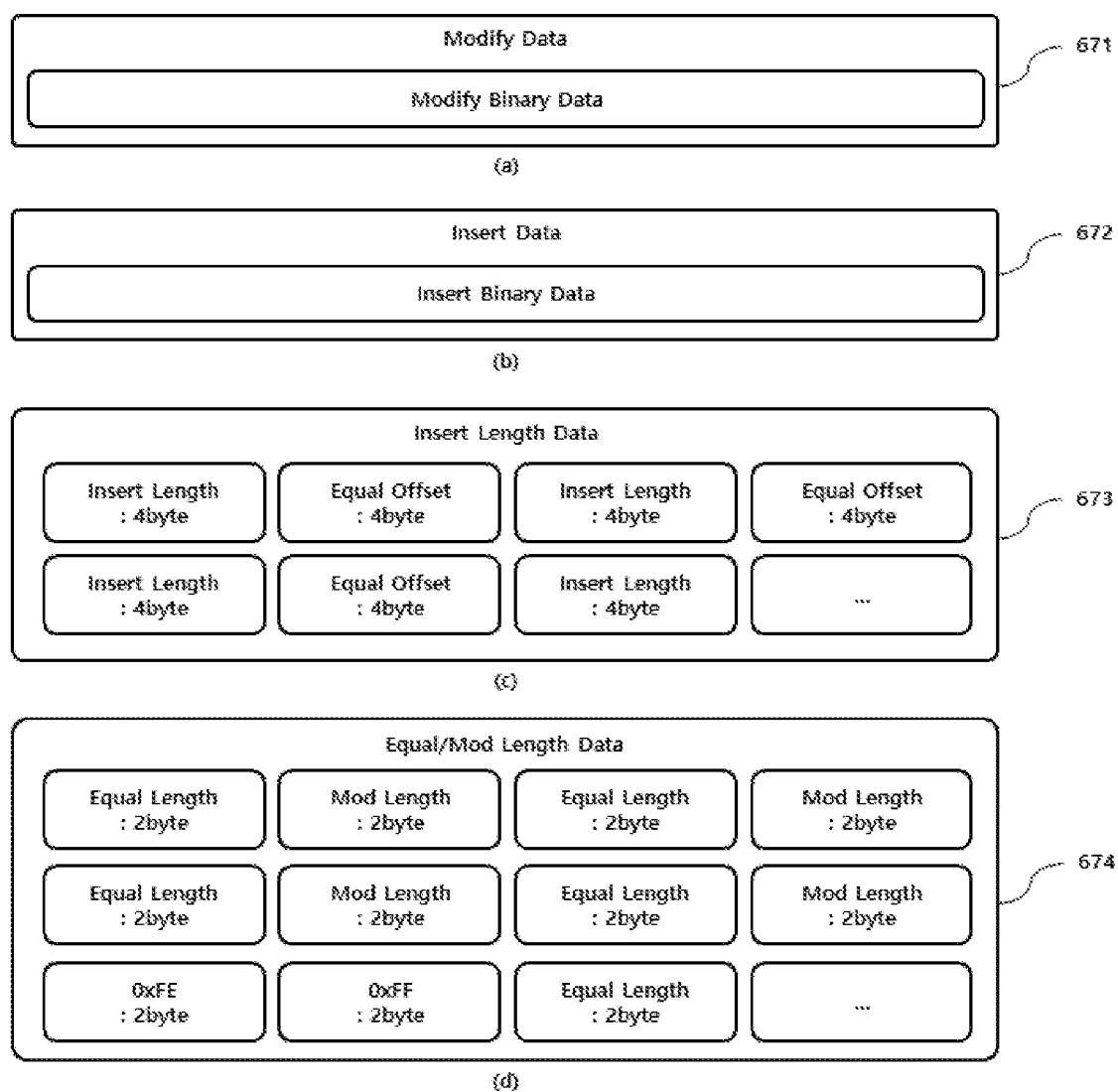
FIG. 9 is a drawing showing in detail a data structure of a block body according to an embodiment of the present invention.

FIG. 9 is a drawing showing in detail a data structure of a block body according to an embodiment of the present invention.

As shown in FIG. 9(a), the Modify data 671 of the block body 670 is generated as a Modify Binary Data item, and is sequentially stored as much as Mod Length in Equal/Mod Length Data.

In addition, as shown in FIG. 9(b), the Insert Data 672 of the block body 670 is generated as an Insert Binary Data item, and is sequentially stored as much as Insert Length in Insert Length Data.

In addition, as shown in FIG. 9(c), Insert Length Data 673 of the block body 670 is generated with Insert Length item in which the length information of Insert data is recorded and an Equal Offset item in which the position information of the next Equal data is recorded. Wherein, when updating a software data using Insert Length Data 673 in the update agent 400, if the delimiter (0xFEFF) appears in the Equal/Mod Length Data, the data of Insert Length Data is processed. Then, the data is sequentially read from Insert Data by Insert Length and stored in the new version of a block. Subsequently, current position of old version of a block is moved for next Equal by the Equal Offset.

As shown in FIG. 9(d), Equal/Mod Length Data 674 of the block body 670 comprises Equal Length items in which length (2 bytes) information of Equal data is recorded, Mod Length items in which length (2 bytes) information of Mod data is recorded, and 0xFE and 0xFF items recorded as delimiters. Wherein, the update agent 400 uses Equal/Mod Length Data 674 to update the software data as follows. First, Equal/Mod Length Data is sequentially read by 2 bytes at a time to process the data. The current position of the old version of a block starts at 0. And if there exists a value of Equal Length, the data is read from the current position of the old version of a block as much as Equal Length and copied to the new version of a block (the current position of the old version of a block increases by the value of Equal Length). If there exists a value of Mod Length, the data is read as much as the Mod Length from Modify Data and copied to the new version of a block (the current position of the old version of a block increases by the Mod Length value). In process of repeating the steps of reading data as much as Equal Length or Mod Length and copying it to the new version of a block, if there exists Insert data and the delimiter (0xFEFF) indicating the position of next Equal data appears, Insert data is read by Insert Length in Insert Length Data and copied to the new version of a block. And the current position of the old version of a block is moved by Equal Offset in Insert Length Data. The updating of the software data is repeatedly performed until all the information of the Equal/Mod Length Data 674 is processed.

Next, an embodiment of a data structuring method for a difference between old and new data according to the present invention configured as described above is described in detail with reference to FIG. 10. Wherein, each step according to the method of the present invention can be changed in order by environmental situations or those skilled in the art.

Figure 10:
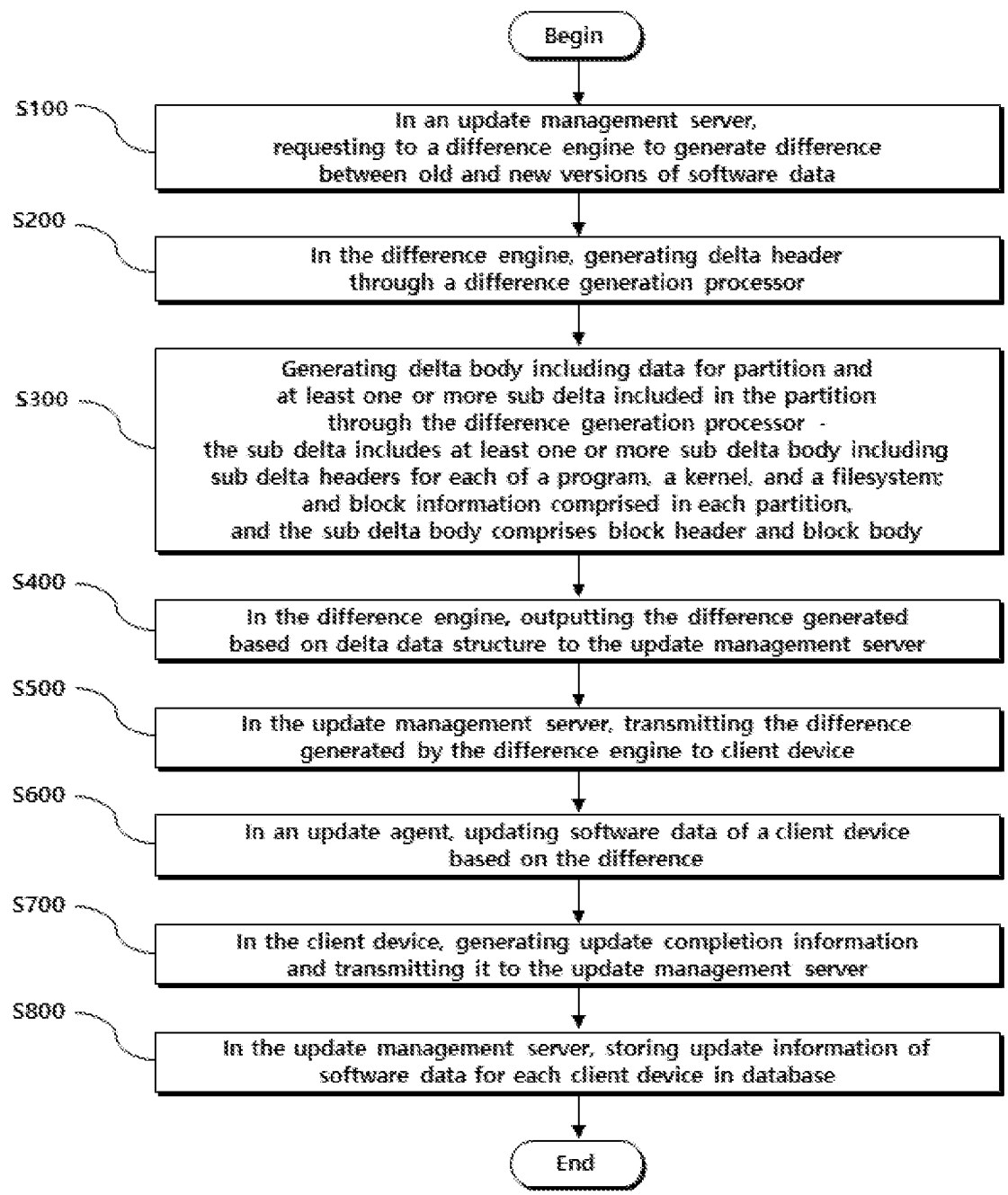
FIG. 10 is a flowchart illustrating in detail an operating process of a data structuring method for the difference between old and new data according to an embodiment of the present invention.

FIG. 10 is a flowchart illustrating in detail an operating process of a data structuring method for the difference between old and new data according to an embodiment of the present invention.

As shown in FIG. 10, when a new version of software data including a program, a kernel, and a filesystem is generated, the update management server 200 requests the difference engine 100 to generate a difference between old and new data in order to update the new version of software data to the client device 300 (S100).

Accordingly, the difference engine 100 generates a difference between old and new data based on a request from the update management server 200. That is, the difference is generated by comparing old and new versions of software data, based on the delta header and the delta data structure (i.e., differential data stream) including the delta header described in FIGS. 3 to 9.

In addition, the difference engine 100 generates a delta header comprising version information of the difference, number of partitions, delta size for each of the partitions, and patch information for normal or resume, in response to the request of the update management server 200 (S200).

After generating the delta header through the step S200, the difference engine 100 generates a delta body comprising data for the partition and at least one or more sub delta included in the partition (S300).

Wherein, the sub delta comprises at least one or more sub delta body comprising sub delta headers for each program, kernel, and filesystem and block information included in each partition. The sub delta body comprises a block header and a block body.

After generating the difference between the old and new data based on the data structure of the delta header and the delta body for the difference through steps S200 and S300, the difference engine 100 provides the generated difference to the update management server 200 (S400).

The update management server 200 receiving the difference between the old and new data from the difference engine 100 through the step S400 transmits the difference generated by the difference engine 100 to the client device 300 through a network (S500).

Then, the client device 300 provides the difference to the update agent 400. And the update agent 400 updates the old version of software data with the new version of software data based on the difference (S600).

Thereafter, the client device 300 generates update completion information of the software data and transmits it to the update management server 200 through a network (S700). And the update management server (200) stores update information of the software data for each client device 300 in the database 500 based on the update completion information of the software data and finishes the update operation (S800).

As described above, the present invention has been described with reference to embodiments shown in the drawings, but these are only exemplary, and thus generally understood, as it is possible to perform various modifications and other equivalent embodiments, by an ordinary skilled person in the field of the art to which the present invention belongs. Therefore, the technical protection scopes of the present invention should be determined by the following claims.

INDUSTRIAL APPLICABILITY

As described above, the method and device according to the present invention can generate a delta data structure (i.e., a differential data stream) comprising a delta header and a delta body for the difference used on updating software data including programs, kernels and filesystems installed on client devices. Accordingly, it is possible to accurately and quickly generate the difference, as well as to easily update the software data of the client device.

In addition, the method and the device according to the present invention can increase temporal and economic efficiencies and convenience because a user does not have to directly visit a service center or a designated place for software update. And the method and the device according to the present invention can improve system stability of the client device by actively managing software data for changes in laws or systems, and for bugs and defects in devices.

The invention claimed is:

1. A method of generating a delta data structure for difference between old and new versions of software data, based on a request from an update management server, when a new software data used for driving a client device is generated, by a difference generation device comprising a difference generation processor and a memory configured to store a program to generate the delta data structure for the difference, and being configured to generate the delta data structure for the difference by calling the program stored in the memory by the difference generation processor, and provide the delta data structure for the difference to an update agent for updating a software on the client device with the delta data structure for the difference, wherein the method comprises:

comparing, by the difference generation processor, the old and new versions of the software data; and generating, by the difference generation processor, a differential data stream with the delta data structure including a delta header and a delta body based on the comparison, wherein generating the differential data stream comprises:
  generating, by the difference generation processor, the delta header comprising version information of the difference, a number of partitions, delta size for each of the partitions, and patch information for a normal patch or a resume patch, to generate the difference between old and new versions of the software data; and
  generating, by the difference generation processor, the delta body comprising data for the partitions and at least one or more sub delta comprised in the partition,
wherein, the generated delta body comprises a sub delta header and at least one or more sub delta body comprising block information comprised in each of the partitions,
wherein, the sub delta body comprises a block header and a block body for a specific block,
wherein, the block body comprises: Modified actual data (Mod), Inserted actual data (Insert), Equal and Mod length data, and Insert length data,
wherein, the Mod is a modified binary data, and is sequentially generated for the Mod length specified in the Equal and Mod length data,
wherein, the Insert is an inserted binary data, and is sequentially generated for the Insert length specified in the Insert length data,
wherein, the Equal and Mod length data comprise one of Equal length that is length information of which the binary data between old and new versions of a block are the same, Mod length that is length information of which the binary data between old and new versions of the block are modified, and a delimiter indicating the existence of the inserted binary data,
wherein, the Insert length data comprises Insert length that is length information of which the binary data is inserted for a new block, and identical offset that is location information of the next identical binary data,
wherein the difference is generated into the delta data structure comprising a delta header and a delta body, is used on updating software data including at least one or more of a program, a kernel and a filesystem, and represents only different parts between old and new versions of software data and not all of the new version of the software data,
wherein the sub delta header is generated differently depending on whether the software data is a program, a kernel, or a filesystem, and
wherein the block header comprises Equal and Mod length data size information of the block body, Mod data size information of the block body, Insert data size information of the block body, Insert length data size information of the block body, data type information of the block body, block size information, checksum of old version of the block, and checksum of new version of the block,
wherein, the sub delta header, in case of the program, is generated by comprising type information of the sub delta, compression information of whether the sub delta body is compressed or not, size information of the sub delta body, number information of the sub delta body, checksum of old version of program, and checksum of new version of program,
wherein, the sub delta header, in case of the kernel, is generated by comprising type information of the sub delta, compression information of whether the sub delta body is compressed or not, size information of the sub delta body, number information of the sub delta body, checksum of old version of kernel, and checksum of new version of kernel,
wherein, the sub delta header, in case of the filesystem, is generated by comprising a filesystem header and a filesystem sub header,
wherein the filesystem header comprises type information of the sub delta, number information of files, and
wherein the filesystem sub header comprises path information of the files, status information for adding, modifying and deleting of the files, attribute information for general attributes, symbolic attributes, and links of the files, compression information of whether each of the files is compressed or not, size information of the sub delta body, checksum of old version for each of the files, checksum of new version for each of the files, and number information of the sub delta body.

2. A device for generating a delta data structure for difference between old and new versions of software data, based on a request from an update management server, when a new software data used in a client service is generated, and being configured to generate the delta data structure for the difference and provide the delta data structure for the difference to an update agent for updating a software on a client device with the delta data structure for the difference, wherein the device comprises:
  a memory configured to store a program to generate the delta data structure for the difference; and
  a difference generation processor configured to compare the old and new versions of the software data, generate a differential data stream with the delta data structure including a delta header and a delta body based on the comparison, and generate the delta data structure for the difference by calling the program stored in the memory, to provide the delta data structure for the difference, and to generate:
    the delta header comprising version information of the difference, number of partitions, delta size for each of the partitions, and patch information for normal or resume; and
    the delta body comprising data for the partitions and at least one or more sub delta comprised in each of the partitions,
  wherein, the generated delta body comprises a sub delta header and at least one or more sub delta body comprising block information comprised in each of the partitions,
  wherein, the sub delta body comprises a block header and a block body for a specific block,
  wherein, the block body comprises Modified actual data (Mod), Insert actual data (Insert), Equal and Mod length data, and Insert length data,
  wherein, the Mod is a modified binary data, and is sequentially generated for the Mod length specified in the Equal and Mod length data,
wherein, the Insert is an inserted binary data, and is sequentially generated for the Insert length in the Insert length data,
wherein, the Equal and Mod length data comprise one of Equal length that is length information of which the binary data between old and new versions of a block are the same, Mod length that is length information of which the binary data between old and new versions of the block are modified, and a delimiter indicating the existence of the inserted binary data, wherein, the Insert length data comprises Insert length that is length information of which the binary data is inserted for a new block, and identical offset that is location information of the next identical binary data, wherein the difference is generated into a delta data structure comprising a delta header and a delta body, is used on updating software data including at least one or more of a program, a kernel and a filesystem, and represents only different parts between old and new versions of the software data and not all of the new version of the software data, wherein the difference generation processor is configured to generate the sub delta header differently depending upon whether the software data is a program, a kernel, or a filesystem, and wherein the difference generation processor is configured to generate the block header such that the block header comprising Equal and Mod length data size information of the block body, Mod data size information of the block body, Insert data size information of the block body, Insert length data size information of the block body, data type information of the block body, block size information, checksum of old version of the block, and checksum of new version of the block, wherein the difference generation processor generates the sub delta header comprising, in case of the program, type information of the sub delta, compression information of whether the sub delta body is compressed or not, size information of the sub delta body, number information of the sub delta body, checksum of old version of the program, and checksum of new version of the program, wherein the difference generation processor generates the sub delta header comprising, in case of the kernel, type information of the sub delta, compression information of whether the sub delta body is compressed or not, size information of the sub delta body, number information of the sub delta body, checksum of old version of the kernel, and checksum of new version of the kernel, wherein the difference generation processor generates the sub delta header comprising, in case of the filesystem, a filesystem header and a filesystem sub header, wherein, the filesystem header comprises type information of the sub delta, number information of the files, and wherein the filesystem sub header comprises path information of the files, status information for adding, modifying and deleting of the files, attribute information for general attributes, symbolic attributes, and links of the files, compression information of whether each of the files is compressed or not, size information of the sub delta body, checksum of old version for each of the files, checksum of new version for each of the files, and number information of the sub delta body.

* * * * *